US007805394B2

(12) United States Patent
Hartman et al.

(10) Patent No.: US 7,805,394 B2
(45) Date of Patent: *Sep. 28, 2010

(54) APPARATUS AND METHOD FOR THE ANALYSIS OF A PROCESS HAVING PARAMETER-BASED FAULTS

(75) Inventors: Jehuda Hartman, Rechovot (IL); Eyal Brill, Shoham (IL); Yuri Kokotov, MaAle Adumim (IL)

(73) Assignee: Insyst Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/428,529

(22) Filed: Apr. 23, 2009

(65) Prior Publication Data

US 2009/0265295 A1 Oct. 22, 2009

Related U.S. Application Data

(63) Continuation of application No. 11/633,455, filed on Dec. 5, 2006, now Pat. No. 7,536,371.

(60) Provisional application No. 60/741,894, filed on Dec. 5, 2005.

(51) Int. Cl.
*G06F 17/00* (2006.01)
*G06N 5/02* (2006.01)

(52) U.S. Cl. ..................................... 706/48
(58) Field of Classification Search ............... 706/46
See application file for complete search history.

(56) References Cited

U.S. PATENT DOCUMENTS 7,536,371 B2 * 5/2009 Hartman et al. ............... 706/47

| 2003/0225466 A1 | 12/2003 | Yulevitch et al. |
| 2004/0044499 A1 | 3/2004 | House et al. |
| 2007/0156620 A1 | 7/2007 | Hartman et al. |

FOREIGN PATENT DOCUMENTS

WO WO 2004/059399 7/2004

OTHER PUBLICATIONS

European Search Report and the European Search Opinion Dated Feb. 27, 2007 From the European Patent Office Re.: Application No. 06125452.0.
Notice of Allowance Dated Jan. 16, 2009 From the US Patent and Trademark Office Re.: U.S. Appl. No. 11/633,455.
Official Action Dated Feb. 18, 2010 From the US Patent and Trademark Office Re.: U.S. Appl. No. 12/428,529.
Tsai et al. "An Effective and Efficient Hierarchical Fuzzy Rule Based Classifier", International Conference on Machine Learning and Cybernetics, Nov. 2-5, 2003, 4: 2173-2178, Nov. 2003. Abstract. vol. 4: Digital Object Identifier.

* cited by examiner

*Primary Examiner*—Michael Holmes

(57) ABSTRACT

An apparatus for the analysis of a process having parameter-based faults includes: a parameter value inputter configured for inputting values of at least one process parameter, a fault detector, configured for detecting the occurrence of a fault, a learning file creator associated with the parameter value inputter and the fault detector, configured for separating the input values into a first learning file and a second learning file, the first learning file comprising input values from a collection period preceding each of the detected faults, and the second learning file comprising input values input outside the collection periods, and a learning file analyzer associated with the learning file creator, configured for performing a separate statistical analysis of the first and second learning files, thereby to assess a process status.

23 Claims, 13 Drawing Sheets

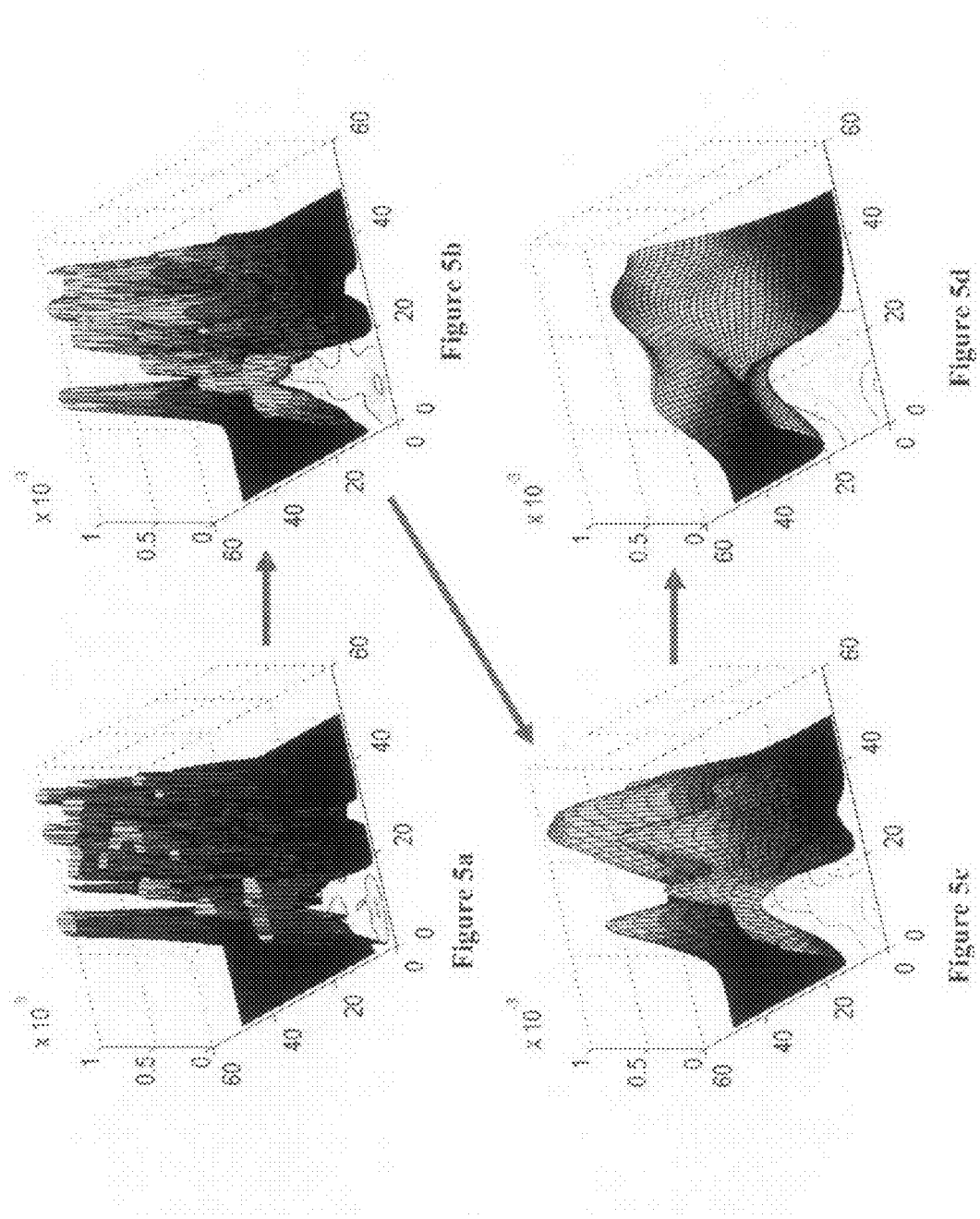

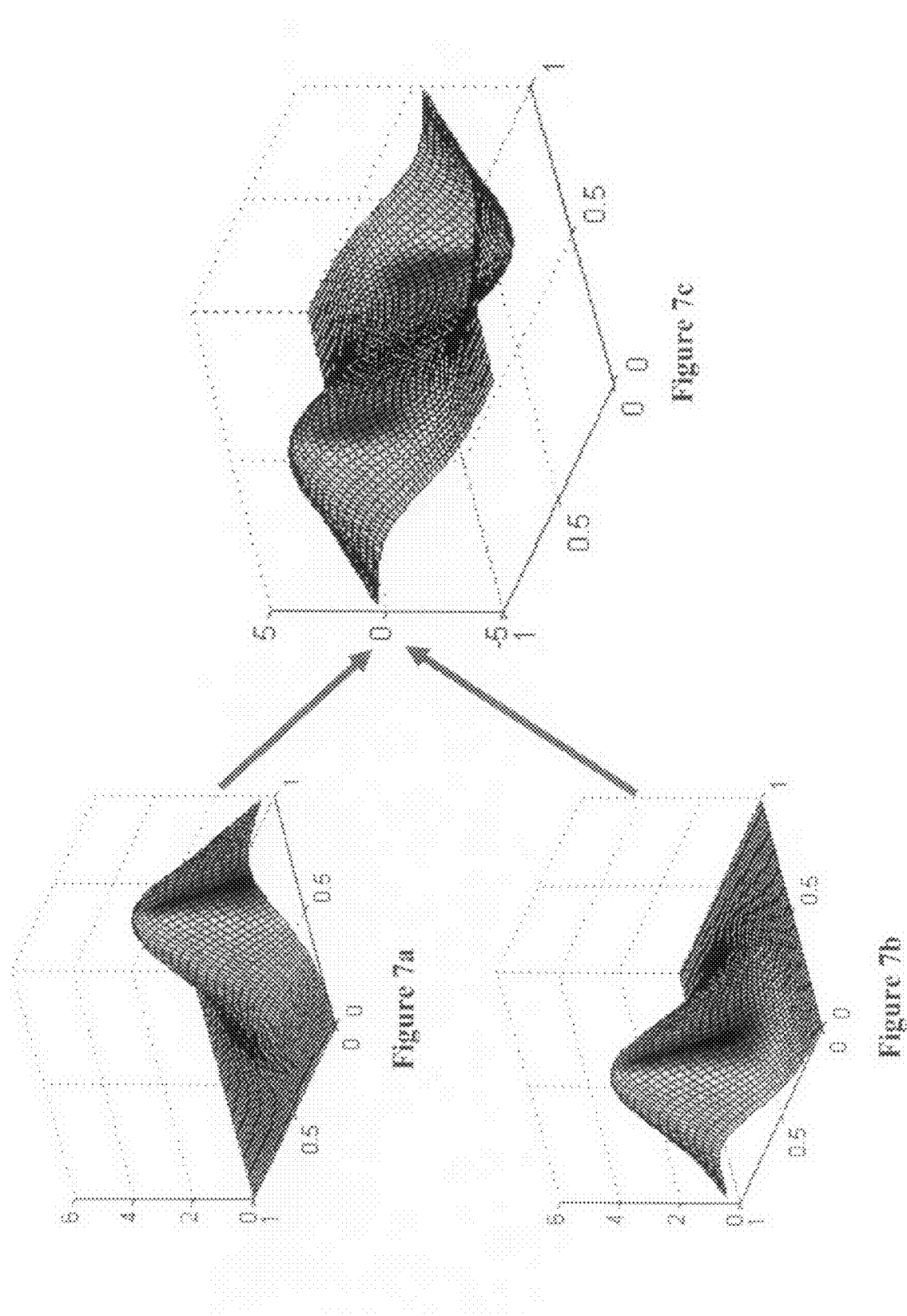

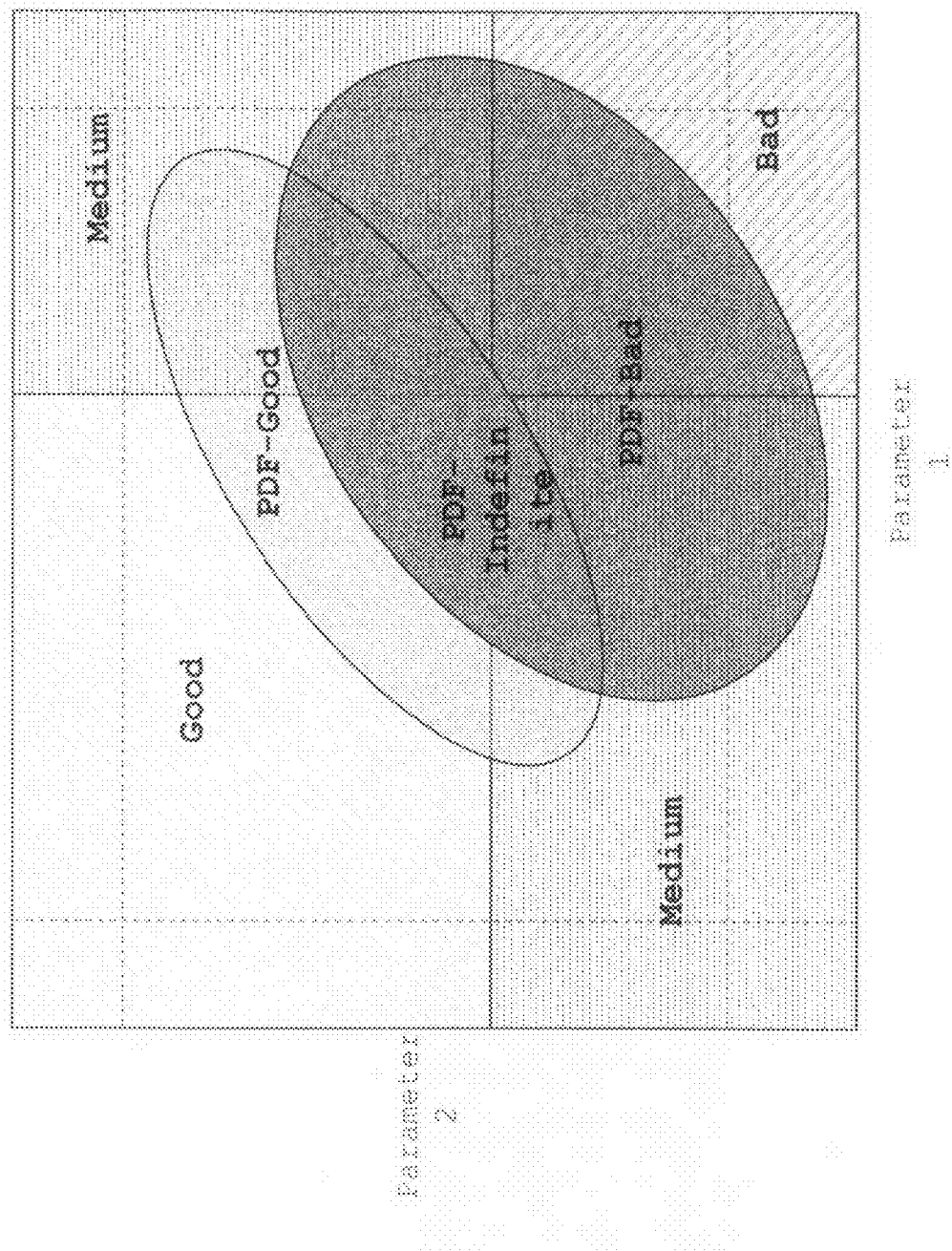

APPARATUS AND METHOD FOR THE ANALYSIS OF A PROCESS HAVING PARAMETER-BASED FAULTS

RELATED APPLICATION

This application is a Continuation of U.S. patent application Ser. No. 11/633,455, filed on Dec. 5, 2006, which claims the benefit of U.S. Provisional Patent Application No. 60/741,894, filed on Dec. 5, 2005, which is herein incorporated in its entirety by reference.

FIELD AND BACKGROUND OF THE INVENTION

The present invention relates to analyzing a process for the purpose of controlling and reducing the occurrence of faults, and, more particularly, to controlling process faults by performing a statistical analysis of collected process parameter values.

Many manufacturing processes suffer from parameter-related faults. A process parameter is a measurable and/or controllable aspect of the process (such as equipment temperature, pressure, material compositions, etc. . . . ) A parameter-related fault is a failure of the process which is linked to the values of the process parameters during a time period prior to the occurrence of a fault, but not necessarily in a deterministic or direct manner. In many manufacturing processes this time period is quite lengthy, on the order of minutes to hours, so that conventional feedback control methods are ineffective. In order to prevent or delay such a fault, it is necessary to identify problematic constellations of parameter values well before there is any evidence that a fault is likely to occur in the near future.

For example, the paper manufacturing process suffers from paper break faults, which are one of the most disruptive and costly problems in the paper manufacturing industry. Paper breaks result in many hours of lost production, process upsets, reduced reliability and significant loss of revenue potential. There is a considerable value and high demand for methods to reduce the number of breaks.

Early detection of an impeding paper break would allow operators to take corrective actions before the break occurs. Prediction models for paper breaks are difficult to build due to the complexity of the production process and the many variables involved in the process. Most paper mills have sensors and measurements on the production line that generate and store manufacturing data. However the collected data must be analyzed and evaluated in order to form predictions of the future process status.

One main goal of on-line process assessment is to determine the current probability that a process fault will occur within a certain upcoming time interval. In other words, what is the expected frequency of a particular failure under the given process conditions?

For illustration, consider a case in which a vehicle tire is not yet punctured, but factors including the tire's wear-and-tear record, the in-tire pressure and the road conditions make the puncture highly probable within the nearest N kilometers. We want to determine the probability for tire puncture within the next N kilometers under the current conditions. That is, what is the probability of tire puncture for a specific tire, under a known pressure, and driving with specific road conditions? Under different conditions, for example on a different road, the probability may be different.

An effective fault control system will, in addition to assessing the probability of an upcoming fault, issue prompts to the process operator suggesting how the probability may be reduced (e.g. change temperatures, materials, etc). Even though the failure is eventually inevitable, the system helps decrease the probability (i.e. reduce the frequency) of this type of failure, thus reducing the consequent losses.

There is thus a widely recognized need for, and it would be highly advantageous to have, a process analysis apparatus and method devoid of the above limitations.

SUMMARY OF THE INVENTION

According to a first aspect of the present invention there is provided an apparatus for the analysis of a process having parameter-based faults. The apparatus includes: a parameter value inputter configured for inputting values of at least one process parameter, a fault detector configured for detecting the occurrence of a fault, a learning file creator, associated with the parameter value inputter and the fault detector, and configured for separating the input values into a first learning file and a second learning file, and a learning file analyzer associated with the learning file creator, configured for performing a separate statistical analysis of the first and second learning files. The first learning file includes input values from a collection period preceding each of the detected faults, and the second learning file includes input values input outside the collection periods. The analysis servers for assessing a process status.

According to a second aspect of the present invention there is provided a method for the analysis of a process having parameter-based faults. The method includes the steps of: inputting the values of at least one process parameter over time, detecting occurrences of process faults, separating the input values into a first learning file and a second learning file, where the first learning file includes input values from a collection period preceding each of the detected faults, and the second learning file comprising input values input outside the collection periods, and performing a separate statistical analysis of the first and second learning files, thereby to assess a process status for a specified set of parameter values.

The present invention successfully addresses the shortcomings of the presently known configurations by providing an apparatus and method which analyzes parameter data collected during process operation, and performs separate statistical analyses of normal and pre-fault parameter data. The dimensions of the calculations may be reduced by clustering interrelated parameters.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 5a-5d illustrates a smoothing operation to obtain a smoothly varying PDF;

FIGS. 7a-7c illustrates how a Normal PDF and Fault PDF may be combined to form a risk score distribution for a pair of parameters;

FIG. 10 shows a Normal PDF and a Fault PDF superimposed over a two dimensional risk level array;

DESCRIPTION OF THE PREFERRED EMBODIMENTS

Figure 1:
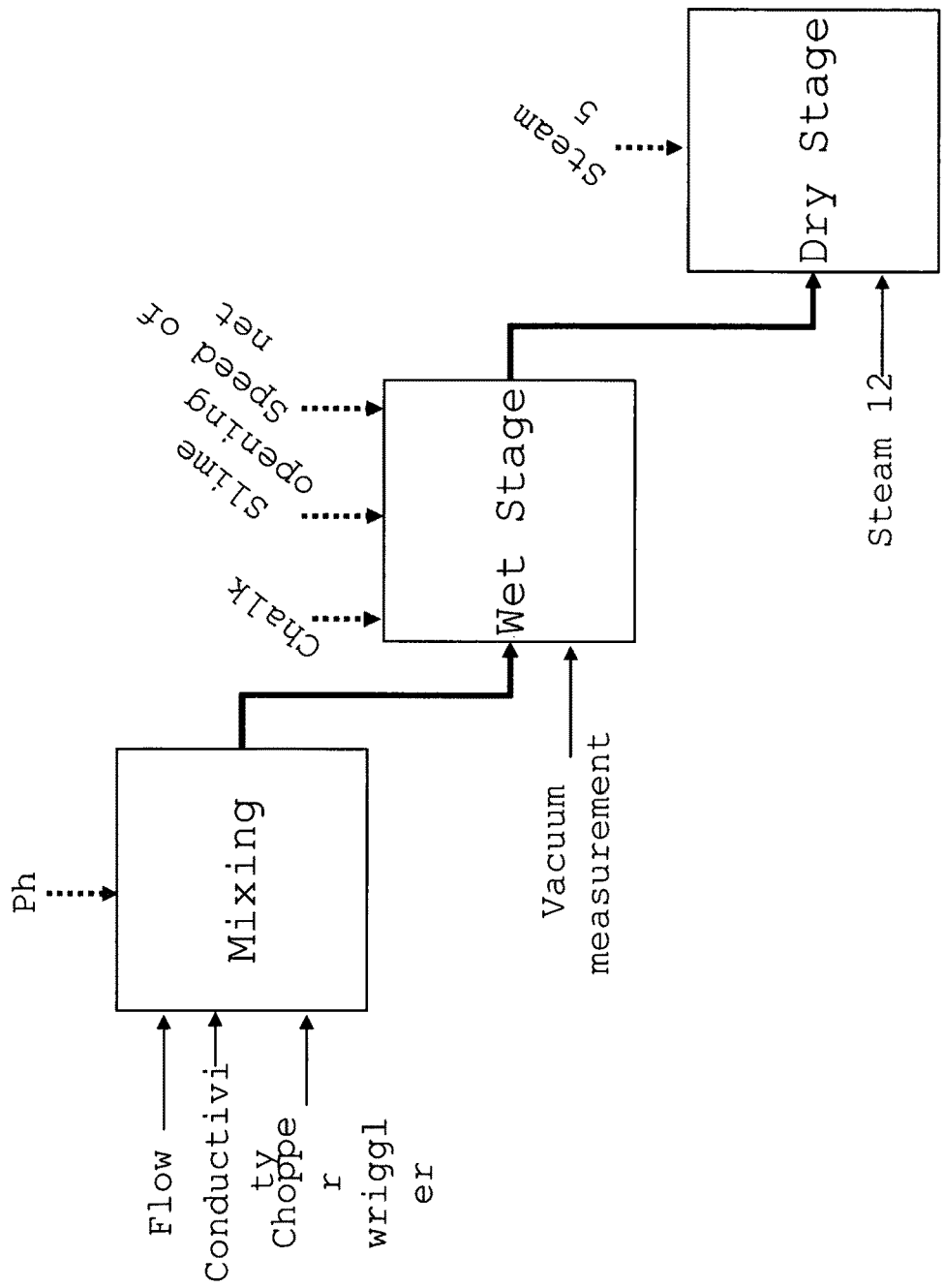
FIG. 1 shows a knowledge tree model of a paper manufacturing process.

The present embodiments are of an apparatus and method for the analysis of a process having parameter-based faults, which monitor a complex process, and provide indicators when the process is moving into conditions which increase the likelihood of a fault. Specifically, the present embodiments may be used both to alert operators to problematic operating conditions and to identify parameter values which may reduce the frequency of fault occurrences.

The present embodiments deal with processes where stoppages and/or failures are known to be inevitable (e.g., paper break during paper manufacturing, tire puncture, etc.). These failures often happen at certain average rate, which depends on the process conditions. In many cases, especially in complicated production lines, resuming the process after such failures usually takes considerable time, and the economic loss is high. The present embodiments use collected parameter value data to create patterns of normal process behavior and to identify on-line deviations from the normal behavior.

The preferred embodiments discussed below:
Use key process variables and optimal lags
Calculate optimal parameter grouping (clusters)
Generate a per cluster probability profile for a fault, based on the current set point
Assign a risk value to the current set point
Provide a risk score for an array of parameter vectors to affect
Provide real-time updates to a process operator The principles and operation of an apparatus and method for analysis of a process according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The following embodiments are directed at a non-limiting exemplary embodiment of paper making process. The process fault to be considered for the purposes of this example is a Paper Tear (PT). The problem of paper breaks (tears) during paper manufacturing is used for the purposes of illustration only. The introduced analysis and control system applies to any manufacturing or parameter-based process in which faults occur at least partially from identifiable parameters of the process.

Parameter-based processes may be characterized as having three types of parameters:

1) Controllable parameters $\{C\}$ which may be changed by the process operator (e.g. pipe feeding clearance, vacuum power, etc.)

2) Measurable (uncontrollable) parameters $\{M\}$ which may be measured or known, but are not directly controlled by the operator (e.g. period of time since the last maintenance check; outside air humidity etc.)

3) Outputs $\{O\}$ (e.g. formation, tray water, steam etc.)

The following embodiments present an analysis methodology which is based on the statistical analysis of collected parameter values (i.e. data). As discussed below, in certain cases there is a correlation or relationship between several parameters. In these cases it is often beneficial to examine the impact of the interrelated parameters as a cluster.

To cope with the complexity due to the multitude of variables involved in a parameter-based process, a process model is developed. For a better understanding of a process under analysis, particularly one in which the number of parameter values and their sub values is too large for easy distribution into areas and sub-areas, the parameters may be organized into a Knowledge Tree (KT) with multiple cells and multiple layers. The KT model represents a breakdown of a process into intermediate process stages. The outputs of the lower intermediate stages become the inputs, or parameter values, of the stage above it in the hierarchy of the KT. In practice, such cells and layers are created using expert advice in order to break down the process into appropriate stages according to its physical and/or logical aspects, each stage being represented by a cell or a layer. Experts determine which of the parameters are relevant in a particular process or stage of a process. Models are then created for these cells that describe the relationship between the inputs and the outputs of the individual cells. As the process proceeds, newly measured data may validate the real influence that each parameter has on the process.

FIG. 1 shows a KT model of a paper manufacturing process. The paper manufacturing process includes three stages: mixing, wet and dry. Controllable parameters such as pH and chalk are indicated with vertical arrows, whereas measurable parameters such as flow and conductivity are indicated with horizontal arrows. Note that the controllability of a variable may be time dependent. For instance pH in the 'Mixing' stage is controllable but then it is determined and at the Wet Stage it is uncontrollable. The uncontrollable arrow leading from the Mixing stage to the Wet stage is a variable (measured or calculated) expressing the Mixing risk or quality. Similarly, the uncontrollable arrow leading from the Wet stage to the Dry Stage is a variable (measured or calculated) expressing the Wet Stage risk.

It is assumed that there is a causal relationship between the process conditions (i.e. the values of the process parameters) and the occurrence of a fault. In other words, it is expected that a fault is more likely to occur under certain process conditions. Identifying and avoiding such process conditions may reduce the occurrence of fault.

Figure 2:
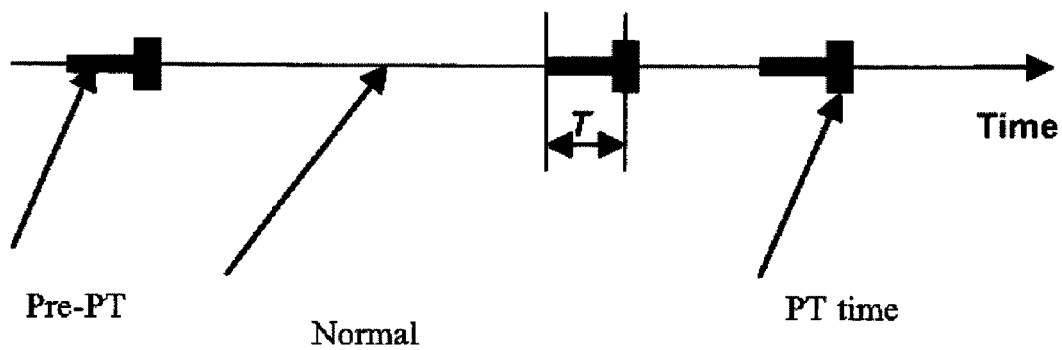
FIG. 2 illustrates a timeline for fault occurrences.

Reference is now made to FIG. 2, which illustrates a timeline for fault occurrences. FIG. 2 shows the occurrence of three faults (PT). Each fault is preceded by a pre-fault (pre-PT) period of length T. The time periods between the pre-PT/fault occurrences are considered to be "normal" operation. It is assumed that the conditions (i.e. parameter values) during the pre-PT period resulted in an increased probability for the occurrence of a fault, relative to the parameter values during normal operations.

Figure 3:
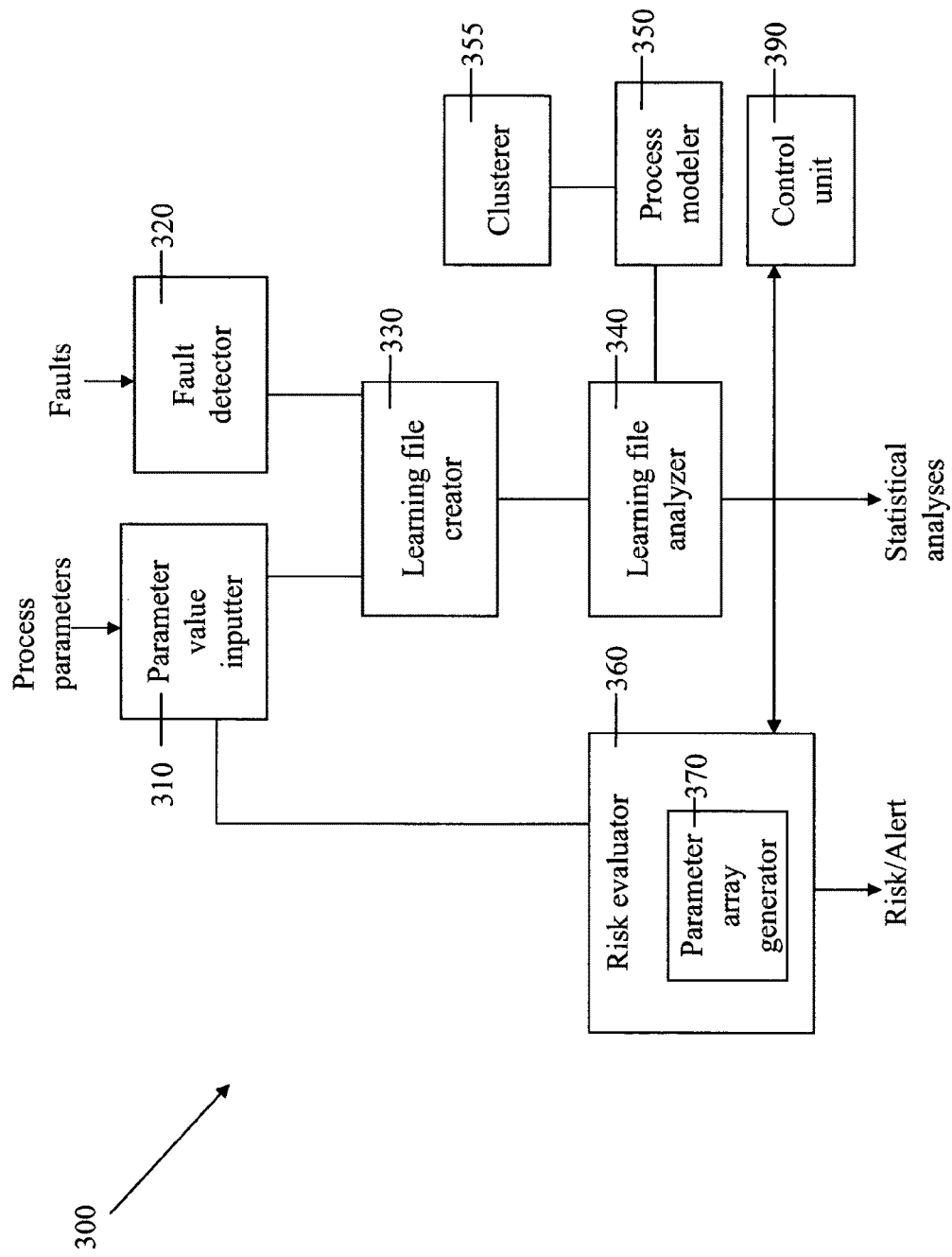
FIG. 3 is a simplified block diagram of an apparatus for the analysis of a process having parameter-based faults, according to a preferred embodiment of the present invention.

Reference is now made to FIG. 3, which is a simplified block diagram of an apparatus for the analysis of a process having parameter-based faults, according to a preferred embodiment of the present invention. Apparatus 300 (denoted herein a process analyzer) includes parameter value inputter 310, fault detector 320, learning file creator 330 and learning file analyzer 340. Parameter value inputter 310 inputs the value of one or more process parameters, which preferably include at least one controllable process parameter. The parameter values preferably undergo an integrity check, and are stored or buffered for further processing. Fault detector 320 detects the occurrence of process faults. Process fault detection may be performed automatically, either by examining the input parameter values or by receiving an indication from a sensor or other unit. Alternately, fault detector 320 may receive input from a user indicating that a fault has occurred. Fault detection is correlated with the timeline of the incoming data, so that it is possible to know when the input values were obtained relative to the occurrence of the fault.

Learning file creator 320 separates the buffered input values into two learning files. The first learning file (denoted the Fault LF) contains input process parameter values from a collection period preceding each of the detected faults. The second learning file (denoted the Normal LF) includes data collected outside the collection periods, which is expected to represent "normal" process conditions over a time interval that is longer than T. In the following, parameter values/functions related to the pre-fault zone are marked by (+), and those related to the normal zone are marked by (−).

Learning file analyzer 340 performs a separate statistical analysis of Fault and Normal LFs. These statistical analyses may be used to assess the process status, as described below. In the preferred embodiment the process status assessment includes an estimated. Pre-fault time or/and estimated probability of the occurrence of a fault within a given time interval, based on a specified (or current) set of parameter values. In other words, the statistical analyses are used to identify parameter values, or constellations of values, which indicate a high probability of an imminent fault. Preferably, the statistical analysis consists of calculating a joint probability density function for the process parameters.

In the preferred embodiment process analyzer 300 evaluates a process risk level on the basis of the separate statistical analyses performed by learning file analyzer 340. The risk evaluation process is described in detail below. In brief, learning file analyzer 340 converts the Fault LF into a first probability density of occurrence and the Normal LF into a second probability density of occurrence, for pairs (or larger clusters) of parameters. Learning file analyzer 340 then superimposes the two probability densities of occurrence onto a single graph (see FIG. 6 below), and determines a fault risk level over the graph based on the superimposed probability densities. In a further preferred embodiment, learning file analyzer 340 calculates an overall process risk by interpolating fault risk levels over multiple graphs.

In the preferred embodiment, process analyzer 300 further includes process modeler 350, which provides a model of the process. Process modeler 350 preferably models the process as a knowledge tree mapping of relationships between the process parameters and process outputs. The Knowledge Tree (KT) for system is built in cooperation with the experts and/or operators, and identifies connections between process outputs with the corresponding measurable and controllable process parameters.

In the preferred embodiment, process analyzer 300 further includes clusterer 355, which clusters interrelated process parameters. Clusterer 355 preferably forms the clusters in coordination with process modeler 350. The clusters jointly provide information about the likelihood of an imminent process fault. In order to obtain effective results, clusterer 355 determines which combinations of parameter are interrelated and should be taken into account, and which are useless in terms of predictions of probabilities and assessing the process situation.

Figure 4B:
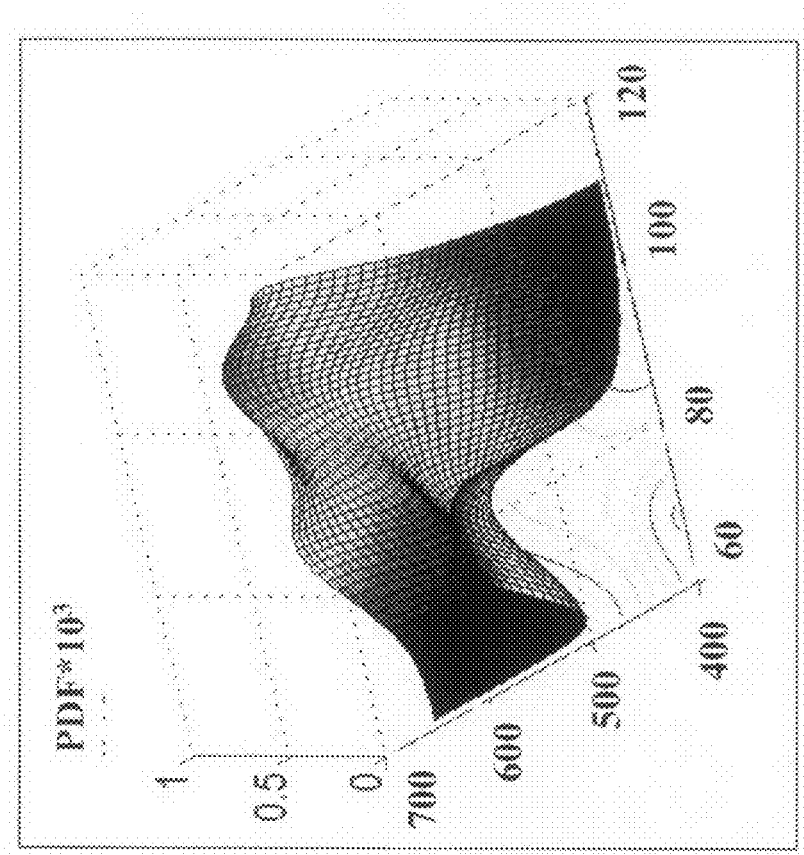
FIG. 4b shows a joint PDF for a cluster of two parameters.
Figure 4A:
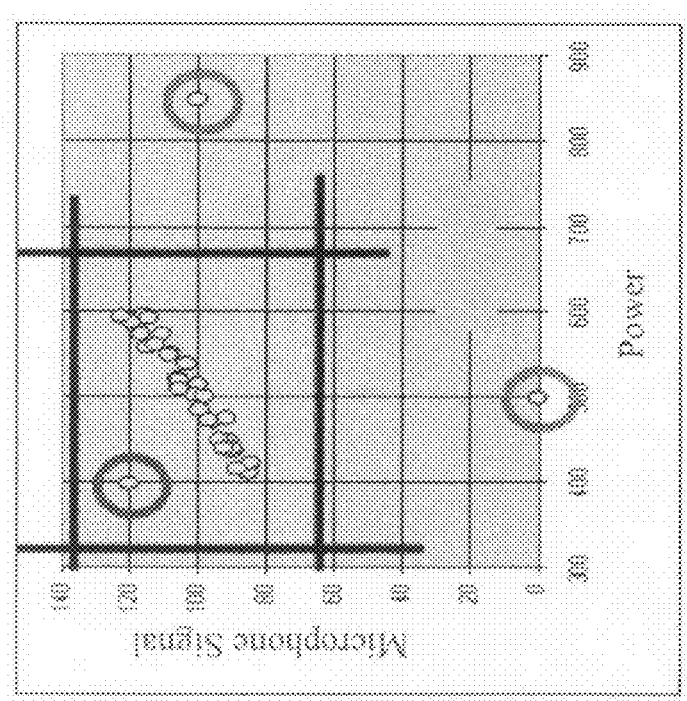
FIG. 4a shows an example of an input value distribution of two process parameters.

Performing a joint statistical analysis for several different parameters is a computationally complex and time-consuming process. In the preferred embodiment the process parameters are grouped into clusters, preferably into pairs, and a statistical analysis of Pre-fault and Normal operation is performed for each cluster independently. Thus, a process having ten parameters may be analyzed by determining the probability density function (PDF) of several pairs of variables that were determined to be representative of the process, which requires only moderate computing resources. Note that a single variable may appear in more than one pair FIG. 4a shows an example of parameter data collected in a learning file, for two parameters (power and microphone signal) of an unspecified process. The parameter values are grouped within a certain range of values, with a small number of outlying data points (circled). FIG. 4b shows a joint PDF for the two parameters, where a higher probability region is seen over the grouped data points.

The statistical analysis performed by learning file analyzer 340 may result in a discontinuous distribution. Preferably, learning file analyzer 340 performs a smoothing operation to obtain a smoothly varying PDF, as shown in FIGS. 5a-5d.

Figure 6:
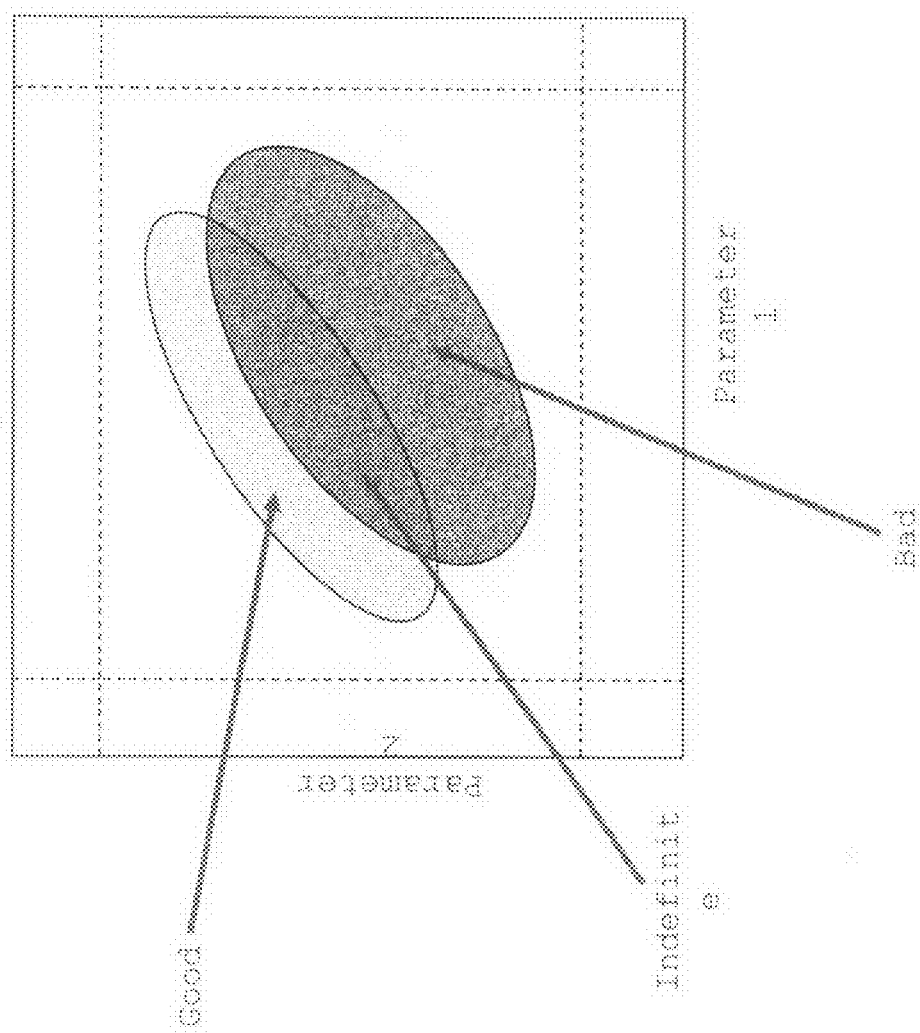
FIG. 6 shows a pair of overlapping PDFs.

Reference is now made to FIG. 6, which is a simplified exemplary diagram of the output of learning file analyzer 340. FIG. 6 shows a pair of overlapping PDFs, which were generated for a clustered pair of process parameters, based on the Fault and Normal learning files. The two PDFs create three regions of parameter values. The region labeled "Good" indicates parameter combinations which occurred only in the Normal LF. A process is operating at these levels will therefore be expected to a low probability of imminent fault. The region labeled "Bad" indicates parameter combinations which occurred only in the Fault LF. The region labeled "Indefinite" indicates parameter combinations which occurred in both the Fault and Normal LFs, and for which it is difficult to evaluate a process status. Parameter values occurring outside the PDFs occur infrequently, and may indicate that the process is operating outside of recommended limits. PCT Pat. Appl. IL2005/001132 presents a system for the detection of rare data situations in processes, and is hereby incorporated by reference in its entirety.

In the preferred embodiment, a single risk score is assigned to clustered parameter values, based on the Fault and Normal statistical analyses. FIGS. 7a-7c illustrates how a Normal PDF (FIG. 7a) and Fault PDF (FIG. 7b) may be combined to form a risk score distribution (FIG. 7c) for a pair of parameters.

Preferred embodiments for statistical analysis and risk evaluation (scoring) are now presented.

As discussed above, a user initially sets the duration of the pre-fault period T based on the user's expertise and knowledge of the process, and the collection period is set to a time interval that is shorter than T. The T value may be set by the user to be the same for all the process parameters, or to be specific for a particular parameter group (cluster) ($T=T_i$). A criterion is introduced below that enables the determination of an optimal value of ($T=T_i$) in order to increase the system's resolution.

In the preferred embodiment, file analyzer 340 performs a separate statistical analysis for each two-parameter cluster (x,y). Two PDFs are built, respectively $\rho_+(x,y)$ and $\rho_-(x,y)$, on the basis of the Fault and Normal Learning Files.

The unconditional probability of the process being in the Pre-fault status is calculated as:

When T has been set uniform for all the clusters, $$p_+ = nT/\Theta N_+/(N_+ + N_-)$$

When T is cluster specific, $$p_{+i} = nT_i/\Theta$$

where n is number of faults, $\Theta$ is the overall duration of the learning period, $N_+$, $N_-$ are the sizes of the Fault and the Normal learning files respectively (the size being the number of elements such as points, records etc. constituting the LF).

Using the Bayes formula, we obtain:

$$p_+|_{x,y} = p_+(x,y)p_+/(\rho_+(x,y)p_+ + \rho_-(x,y)(1-p_+)),$$

where $p_+|_{x,y}$ is a conditional probability of the process being in the Pre-fault status given the values of x and y.

On the basis of the formula, two functions are introduced:

1. Ratio Function $\psi$—

$$\psi = p_+|_{x,y}/p_+ = \rho_+(x,y)/(\rho_+(x,y)p_+ + \rho_-(x,y)(1-p_+)),$$

defines the relation between the conditional and the unconditional probabilities of the process being in Pre-fault, i.e. prediction of the probability of a fault within time interval T.

2. Sample Size Function $\phi$ $$\phi = \rho_+(x,y) + \rho_-(x,y),$$

assesses to what extent the ratio function prediction is well grounded.

The following example illustrates the necessity of the two functions. When estimating the probability of high company revenue, we may receive a high value of $\psi$. However, if this figure is obtained over insufficient statistic sample, the $\phi$ will be low, signaling that the prediction may be not reliable.

In the present case, the smaller the $\psi$ value, the better the process status is in relation to fault conditions, i.e. the probability of a fault appears small. However, if the $\phi$ value is small, the current parameters occur rarely and the process status may be poor. We do not know what exactly the problem is, but we know that our optimistic prediction is not reliable enough.

Preferably, instead of the two $\psi$ and $\phi$ functions, a single combined formula may be used which provides a more efficient combined estimation of the $p_+|_{x,y}/p_+$ relationship:

$$\Phi(x,y) = \psi(x,y)(1 + \epsilon/\phi(x,y))$$

where $\epsilon$ is an optional (preferably small-valued) parameter defined for a specific process model.

A cluster-specific function, $\Phi_i$, is also introduced. $\Phi_i$ expresses the conditional probabilities of the process being in Pre-fault status from the point of view of a given cluster. The function $\Phi_i$ may be used to rate the efficacy of the process operator decisions from the point of view of a particular cluster.

A $\Phi$ chart which graphically represents the value of $\Phi$ of as a function of the parameters (x,y) may be generated and provided to the process operator. The $\Phi$ chart may prove useful to the process operator by showing preferable combinations of the process parameters (x,y) in order to avoid the fault.

The function $\Phi_i(x_i,y_i)$ may be used to estimate the average time before fault from the point of view of specific parameter values of a particular cluster i:

$$Tav_i = T_i/(2p_{+i}\Phi_i(x_i,y_i))$$

If the probability of a fault is low for a certain cluster, the cluster-related $T_{av}$ value will be high. Likewise, a low value of $T_{av}$ indicates a high probability of a fault.

The function $\Phi_i$ estimates the steadiness of the current process situation in relation to fault occurrence, the efficiency of the Process Operator decisions etc, from the point of view of a particular cluster. A criterion is now described which enables informative cluster selection.

A cluster $(x_i,y_i)$ is informative for only if its role in the process influences the fault probability of occurrence. That is:

Areas in the parameter space of $x_i,y_i$ where $\Phi_i > 0$ or $\Phi_i < 0$

Those areas are populated with points from a LF

A preferred embodiment of a cluster selection criterion that meets the above-formulated requirements is based on:

C=the value of $(\Phi_i(x,y)-1)^2$ averaged over the Fault LF and the Normal LF 2.

The user sets the range of C values for cluster selection (e.g., the first five clusters with C above a given value).

Until now we have selected a number of relevant clusters and collected their particular 'assessment' of the risk level for a given cluster. A final decision may then be formulated on the overall process status, based on a generalization of the individual cluster risk levels.

In the preferred embodiment, process analyzer 300 further includes risk evaluator 360, which evaluates a fault risk level for a process operating at a specified set of process parameter values. In the preferred embodiment the fault risk level is evaluated as an estimated time until fault and/or an estimated probability of a fault within a specified time interval. The fault risk level may be determined as described below.

Suppose that there are K clusters with C values $C_1, \ldots, C_K$ that are within the range of relevance. These clusters have $\Phi$ functions $\Phi_1(x_1,y_1), \ldots, \Phi_k(x_k,y_k)$. The corresponding average Pre-fault times are:

$$Tav_1 = T_1/(2p_{+,1}\Phi_1(x_1,y_1)), \ldots, Tav_k = T_k/(2p_{+,k}\Phi_k(x_k,y_k))$$

A model is built for predicting the time until fault (i.e. the predicted Pre-fault time) as based on the per-cluster average Pre-fault times $Tav_1$:

$$\tau = F(Tav_1, \ldots, Tav_k)$$

$\tau$ is the predicted Pre-fault time and $Tav_i$ is the estimated Pre-fault time for a particular cluster. The model may be based on expert judgment, averaging, simple regression, and other factors.

The probability of a fault within time interval T under given conditions may be estimated from $\tau$ as follows:

$$p_+^{CONDITIONAL} = T/2\tau$$

This probability may be more valuable for the client than the estimated average Pre-fault time.

Thus the risk level for parameter values $\{(x_1,y_1), \ldots, \Phi_k(x_k,y_k)\}$, may be given as one or a combination of $\tau$ and $p_+^{CONDITIONAL}$.

Preferably, process analyzer 300 serves to monitor an ongoing process, in which case the risk evaluator operates on the current parameter values. When process analyzer 300 identifies that the process is operating with parameter values which indicate a high probability for the occurrence a fault (i.e. a high risk level), the operator may be alerted and provided with information to assist the operator to avoid the upcoming process fault.

Preferably, when the predicted Pre-fault time, $\tau$, is smaller than the present average value, $T_{av}$, the process operator is provided with:

Alarm

The estimated time until fault $\tau$ or/and estimated probability of PT within a given time interval $p_+^{CONDITIONAL}$ $\Phi$-charts for relevant clusters with marked current value points On the basis of the information provided by the system, the process operator may choose to change the process parameters or materials ("recipe"). For an on-line process, the operator may be provided with feedback showing the impact of his latest decision on the process behavior. The feedback information preferably includes:

The impact of the recipe changes on the predicted Pre-fault time $\tau$ or/and estimated probability of fault within a given time interval $p_+^{CONDITIONAL}$ The trajectories of the parameter values after the recipe change, against the background of the relevant clusters.

In this way, the process operator may benefit from a continuous on-line assessment of the changes made in the process recipe, thereby providing the basis for the next decisions to be made.

In the preferred embodiment, process analyzer 300 further includes control unit 390 which determines preferred values for one or more of the controllable parameters, so as to reduce a probability of a fault.

The defined function F expresses the dependence of the predicted Pre-fault time on the basis of the inputs. Control unit 390 preferably finds the values of controllable parameters that maximize F value, and then proposes these values to the process operator as the recommended optimum recipe.

A difficulty arises when F depends not only on process inputs but also on certain outputs {O} that in turn depend on controllable values {C}, and which will therefore be changed when {C} values change. In such situations, in order to be able to perform optimization (i.e. to maximize F values) it is necessary to build predictive models using a KT and possibly a design of experiments (DOE). The DOE approach conducts and analyzes controlled tests to evaluate the factors that control the value of a parameter or group of parameters, and provides a causal predictive model showing the importance of all parameters and their interactions.

The optimization task may be formulated as:

$$F(\{\Phi(\{M\},\{C\},\{O_{predicted}(\{M\},\{C\})\}\}) \to \max \text{ by } \{C\}$$

Control unit 390 performs the above optimization, and provides real-time recommendations for controllable parameter values (recipes) that are expected to reduce the likelihood of a fault. The recommendation may be based on the past data records of a unit, such as a production machine, that has controllable and uncontrollable (measurable) process variables as well as fault event records.

Control unit 390 preferably performs 'dynamic targeting' on the production process, whereby intermediate targets like mixing risk may be modified due to failures in outcomes of previous recipes. For example, in the paper-making process of FIG. 1, if the value of the controlled variable pH was different from its intended target value (Mixing risk), its value is considered uncontrolled in 'Wet Stage' and the target value of 'Dry Stage' risk will be adjusted so that the final target (Break risk) is held intact or minimized. U.S. Pat. Nos. 6,728,587 and 6,678,668 address the issue of dynamic targeting, and are hereby incorporated by reference in their entirety.

Figure 8A:
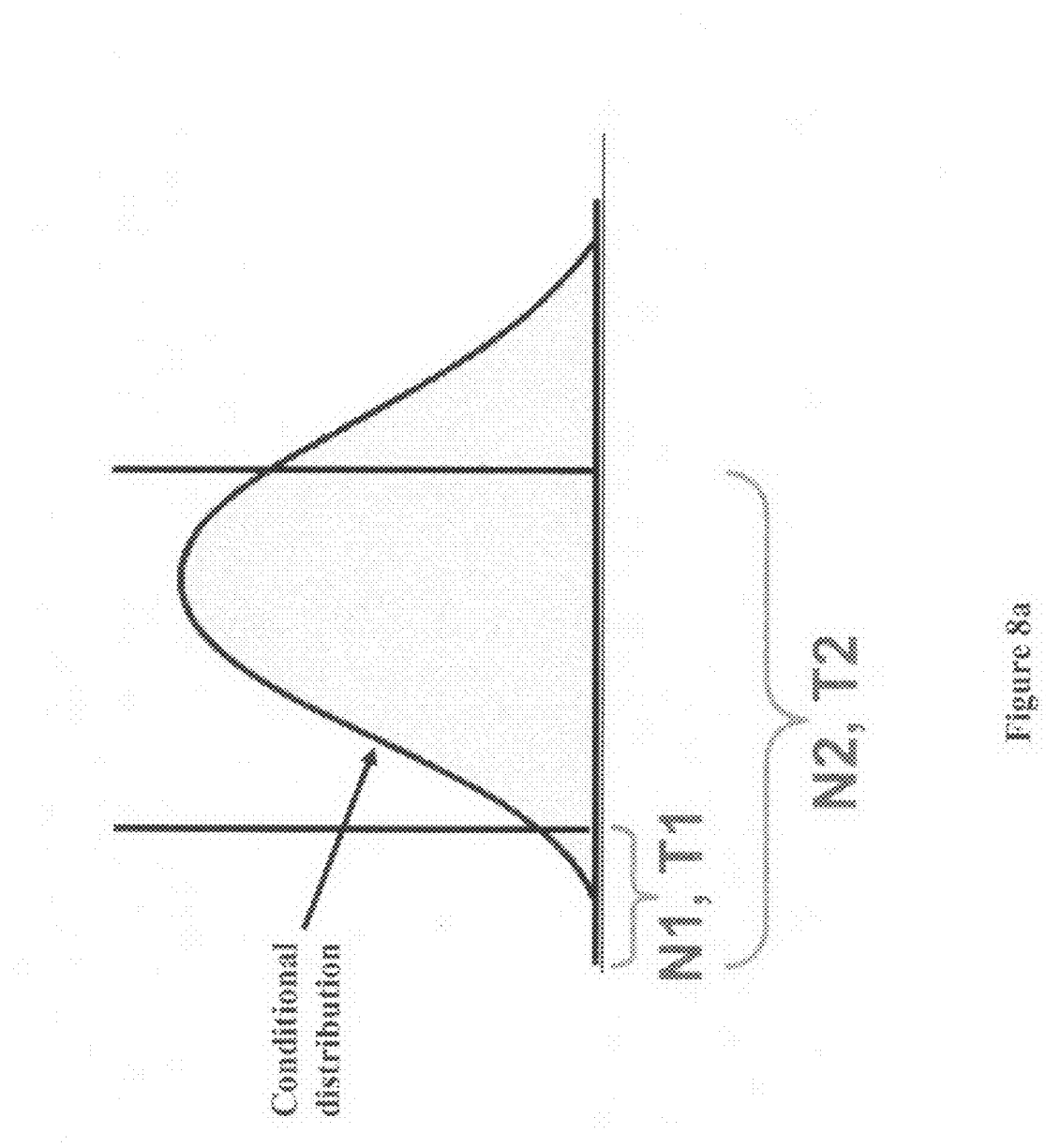
FIG. 8a shows a parameter distribution split into sub-ranges.

In the preferred embodiment, process analyzer 300 includes a discretizer which divides a range parameter values into discrete sub-ranges. Preferably, the discretizer selects split values for the sub-ranges which maximize an average time between faults while retaining a statistically significant sample within a range, as shown in FIG. 8a.

A preferred embodiment for selecting split values for a selected controllable process parameter is performed as follows.

1) Divide the measurable (uncontrollable) parameter values into sub-ranges. Any combination of measurable parameter values may thus be classified as a discrete vector.

2) Based on collected parameter value data, generate a record subset of all past records with the common uncontrollable vector.

3) For each controllable parameter, generate a histogram of the length of time that the process was at various controllable parameter values.

4) Find a value $X_n$ of the controllable parameter such that the average time between faults $T_n$ is as large as possible (on one side) while keeping the number of observations N statistically significant. Xn is a controllable parameter split value that yields a 'good' split between a high fault risk and a low fault risk with statistical significance.

Figure 8B:
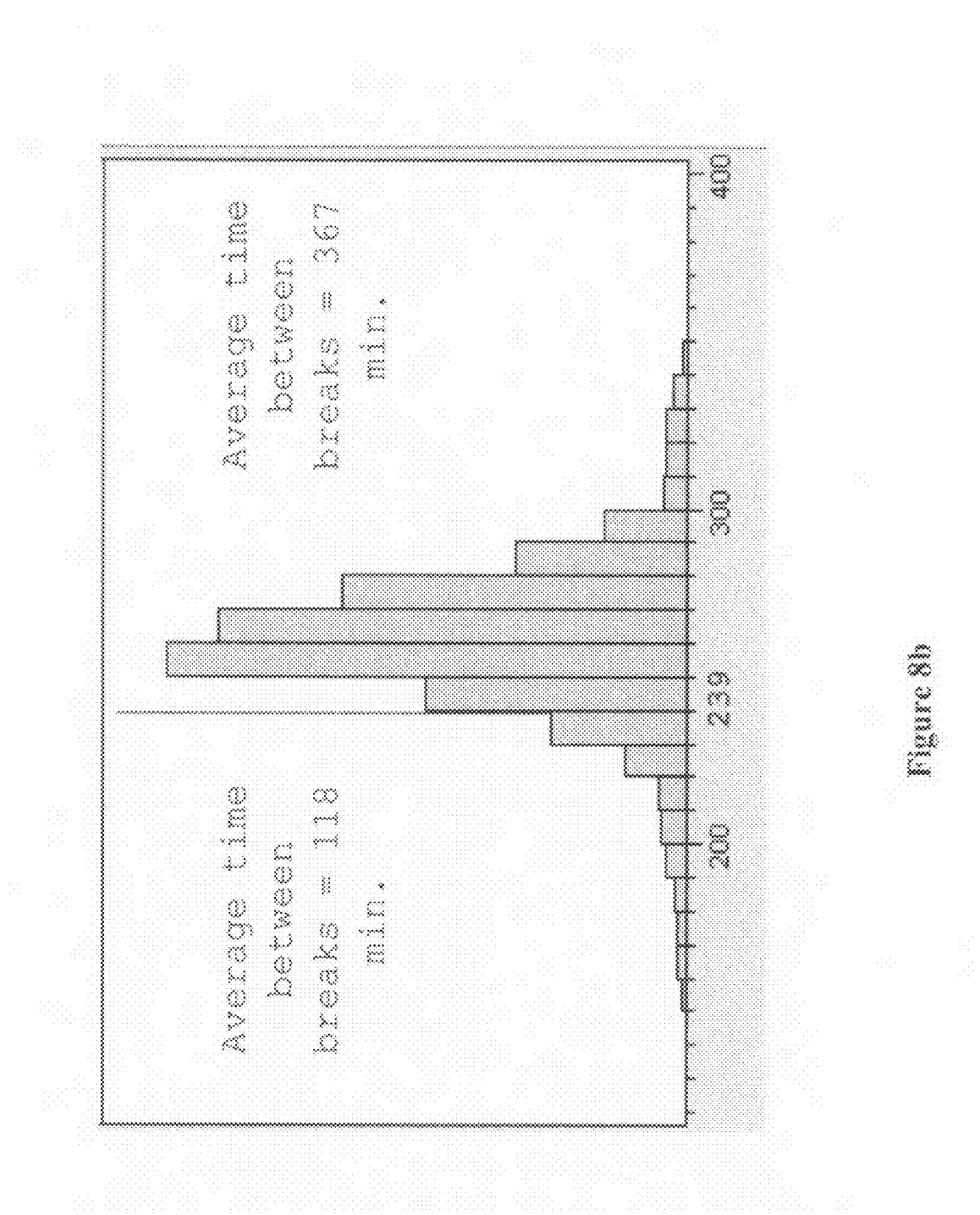
FIG. 8b shows a histogram for chalk levels in a paper making process.

FIG. 8b shows an example of a histogram for chalk levels in a paper making process. Paper break frequency was 3.1 times higher in observations where chalk levels were less than 239. About 16% of observations were in this category. A chalk level of 239 is therefore a good split level for this parameter.

The above-described embodiments perform statistical analyses of collected process parameter value data. The evaluation of a process risk level from these statistical analyses is a computationally complex task, even when parameters are clustered together, so that process risk evaluations may be performed on a per-cluster basis. In the preferred embodiment discussed below, historical process parameter data is analyzed to compile a multi-dimensional array of discretized process parameter values. The array then serves as a lookup table, for estimating the risk level for a current (or otherwise specified) constellation of parameter values.

In the preferred embodiment, risk evaluator 360 includes parameter array generator 370 which maintains a risk level array for the process. Each dimension of the array is associated with a respective process parameter, which is subdivided into sub-ranges (see below). A risk level is determined for each element of the array, based at least in part on the Normal and Fault PDFs. The risk level is preferably determined from a historical distribution of the risk level for each element of the array, as determined over time by risk evaluator 360.

In a further preferred embodiment, the risk level is derived from Pre-fault time $\tau$ or/and estimated probability of fault within a given time interval $p_+^{CONDITIONAL}$.

Figures 9A, 9B:
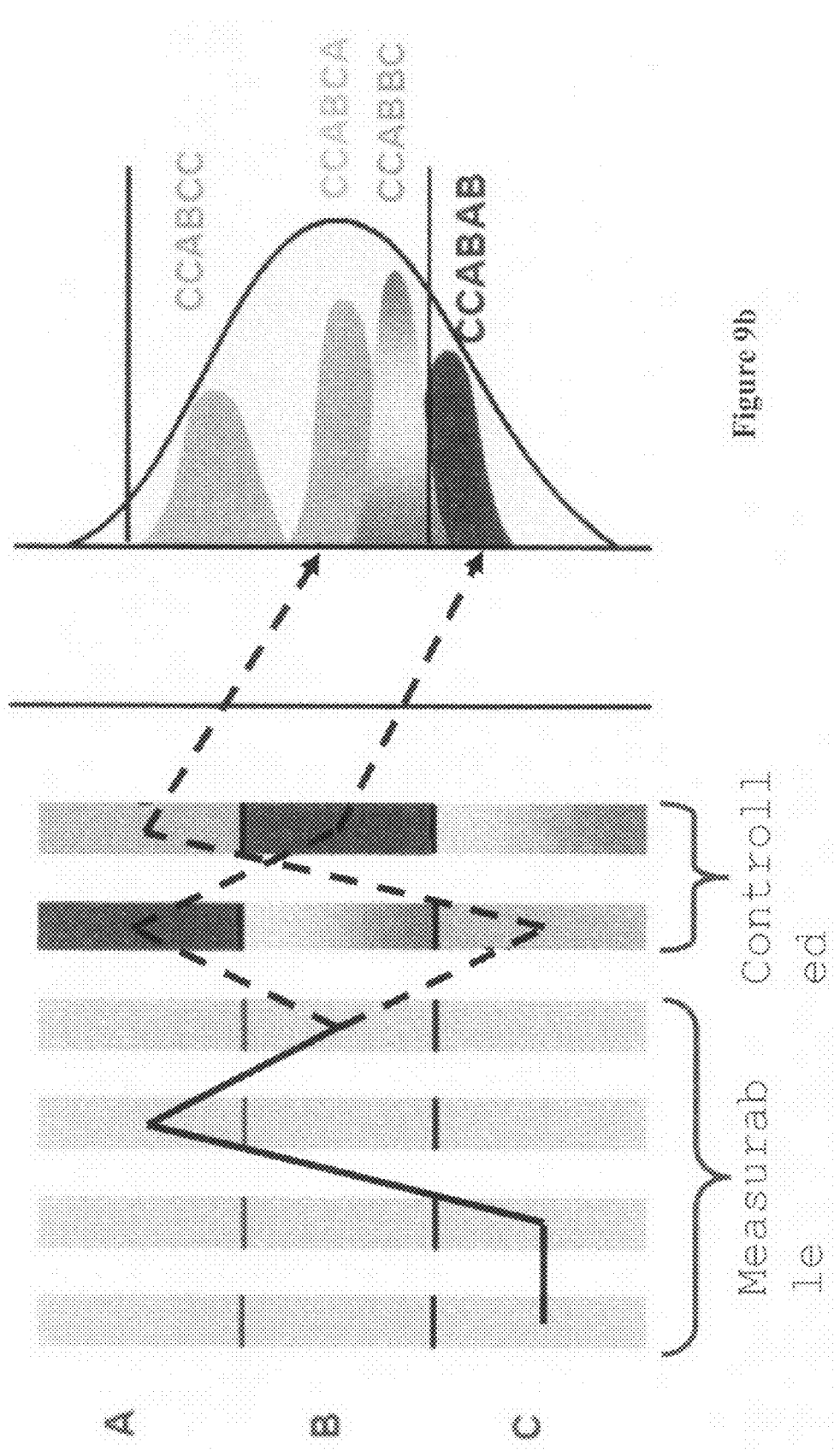
FIG. 9a shows a set of six process parameters.
FIG. 9b shows a historical risk level distribution for four individual vectors and for the overall set of vectors.

FIG. 9a shows a set of six process parameters, of which four are measurable and two are controllable. FIG. 9b shows a historical risk level distribution for four individual vectors (CCABCC, CCABCA, CCABBC and CCABAB), and for the overall set of vectors. Vectors CCABCC and CCABAB are considered high-risk vectors, vector CCABBC is considered a medium risk vector and vector CCABCA is considered a low risk vector.

The risk level array serves as a lookup table for risk evaluator 360. As a current set of parameter values is read in by parameter value inputter 310, the corresponding risk level is obtained from the risk level array. An ongoing process may thus be monitored with a minimal investment of computational resources, even when the process involves a large number of parameters.

In the preferred embodiment the risk level is a binary indicator, which indicates high-risk and low-risk process conditions. An alert may be provided to the process operator whenever a high-risk indicator occurs, when a high-risk indicator occurs with a certain frequency, or according to specified alert rules.

As discussed above, errors may occur when the statistical sample upon which an analysis is based is inadequate. Combining the double-PDF analysis described above with the risk level array enables determining the current process status with a greater level of confidence.

Reference is now made to FIG. 10, which shows a Normal and a Fault PDF superimposed over a two dimensional risk level array. The graph visually provides the operator with the risk level estimates of both the dual-PDF and the risk level array. As discussed for FIG. 6 above, the dual-PDFs indicates three regions, which correspond to Good, Bad, and Indefinite risk estimates. In addition, each quadrant of the graph visually indicates the risk level given by the corresponding entry in the risk level array (for example, each quandrant may be colored to reflect the risk level array estimate). The process operator may thus compare both estimates when analyzing the current process status.

Figure 11:
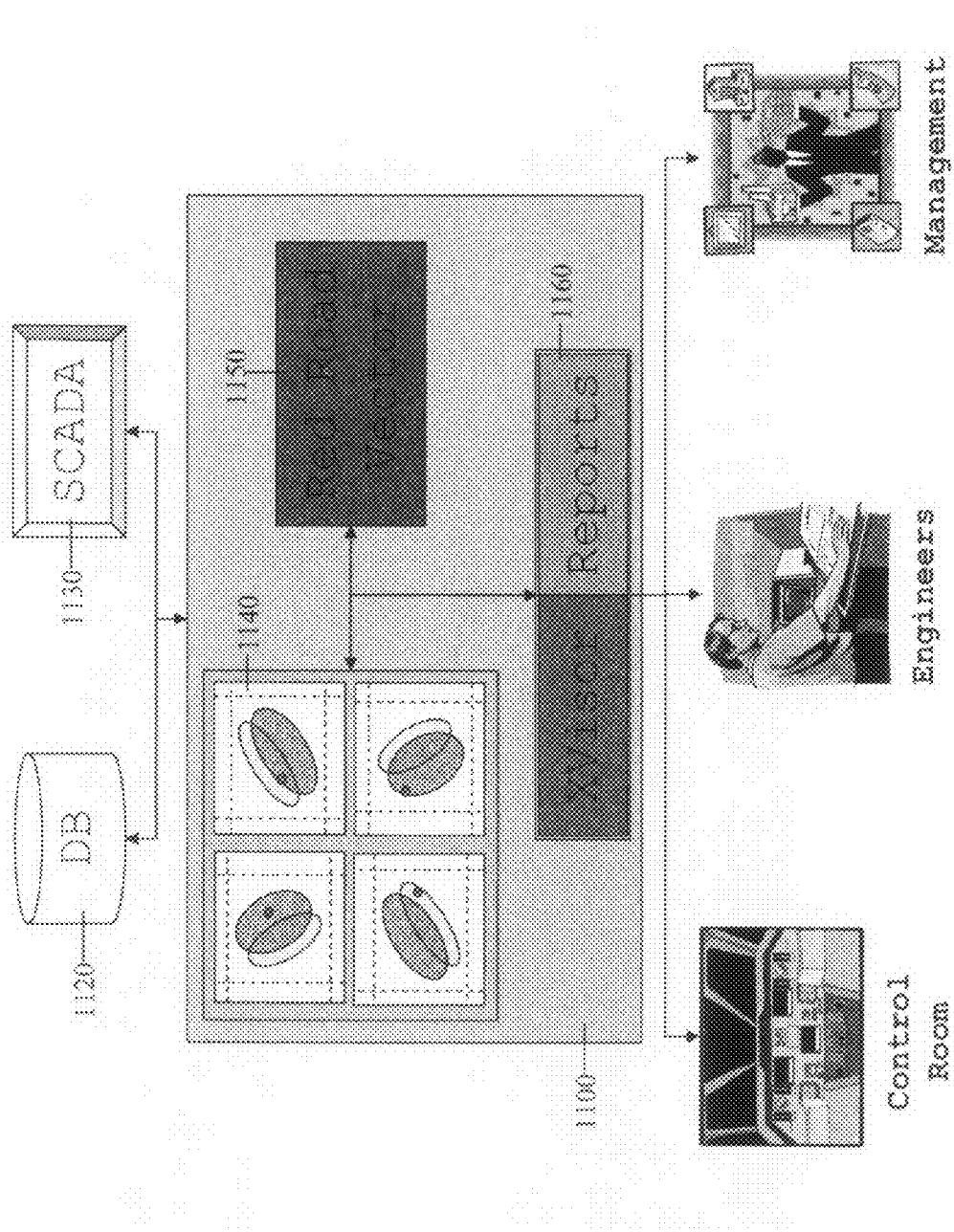
FIG. 11 is a simplified block diagram of a system for the monitoring and control of a parameter-based industrial process, according to an exemplary embodiment of the present invention.

Reference is now made to FIG. 11, which is a simplified block diagram of a system for the monitoring and control of a parameter-based industrial process, according to an exemplary embodiment of the present invention. Monitor unit 1110 obtains parameter value data from database (DB) 1120 and Supervisory Control and Data Acquisition (SCADA) unit 1130, and performs dual-PDF 1140 and risk level array analyses (denoted "Red Road Vector") 1150 upon the data. Alerts and reports are then generated by report unit 1160, and provided to control room operators, engineers and management personnel.

Figure 12:
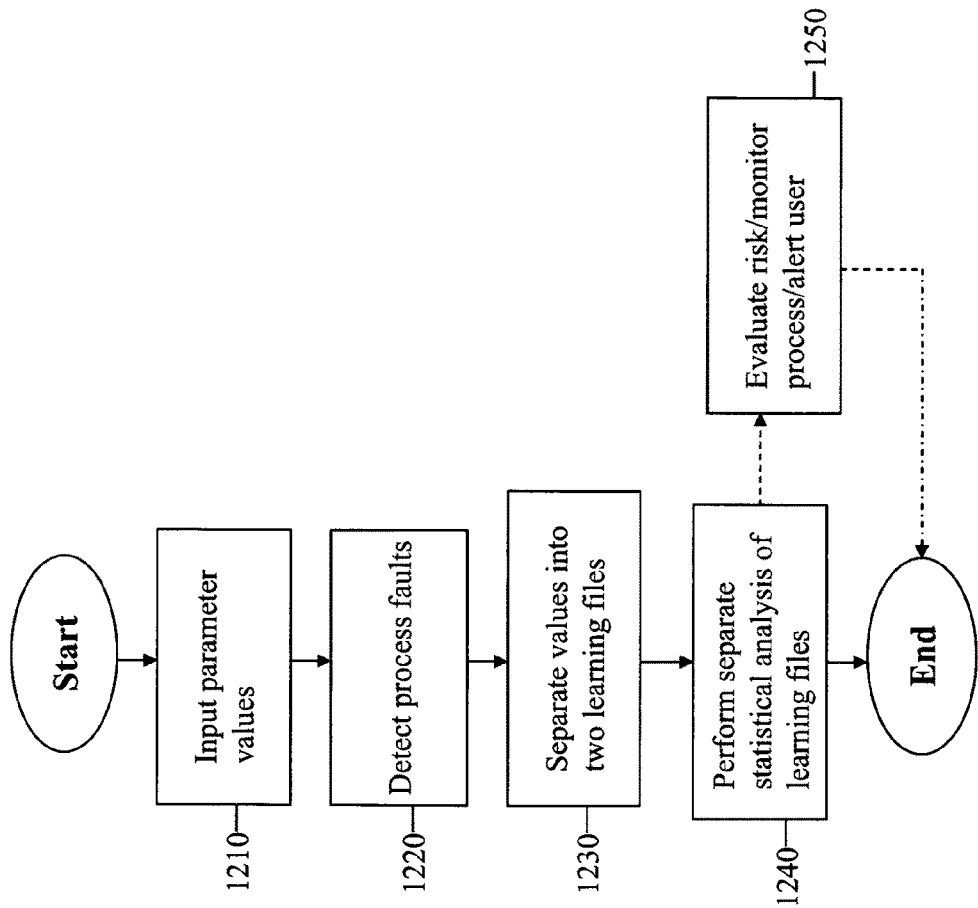
FIG. 12 is a simplified flowchart of a method for the analysis of a process having parameter-based faults, in accordance with a preferred embodiment of the present invention.

Reference is now made to FIG. 12, which is a simplified flowchart of a method for the analysis of a process having parameter-based faults, in accordance with a preferred embodiment of the present invention. In step 1210, the values of at least one process parameter are input. The parameter values are recorded over a time period, which preferably includes multiple faults and intermediate normal periods to allow for a statistically significant collection of data.

In step 1220, process fault occurrences are detected. Based on the detected process faults, two learning files are created in step 1230. The learning files consist of a Fault LF which includes parameter values from a collection period preceding each of said detected faults, and a Normal LF which includes parameter values from normal periods (i.e. does not include data Pre-fault periods).

In step 1230, a separate statistical analysis of the two learning files is performed as described above. The statistical analyses may serve to assess the process status for a specified set of parameter values. Preferably the statistical analyses are performed separately for defined clusters of parameters. Preferably, the statistical analysis provides a dual-PDF statistical analysis of the parameter data.

Preferably, the method includes the further steps of evaluating process risk and/or monitoring an ongoing process and/or providing user alerts and information (indicated jointly as step 1250). Evaluating process risk preferably includes correlating a dual-PDF statistical analysis with a risk level array, as described for FIG. 10.

In the preferred embodiment a process risk level is determined by converting the first and second learning files into separate probability densities of occurrence, for at pairs (or larger clusters) of parameters. The probability densities are then superimposed onto a single graph, and a fault risk level is determined over the graph with respect to the superimposed probability densities.

Preferably, the method includes the further step of interpolating fault risk levels determined over a plurality of graphs to obtain an overall risk.

In summary, a knowledge tree maps the process stages (such as the mixing, wet and dry stages of the paper making process). The dual-PDF (Normal/Fault) methodology provides a unique estimation of the process fault risk. The risk level array methodology delivers recommendations based on past history, which are correlated with the results of the dual-PDF analysis. Key variables, the associated risk and the recommendations may be visualized in a simple graphical user interface (GUI).

The above-described embodiments present a highly effective apparatus and method for analyzing parameter-based faults in a process, for monitoring an ongoing process, and for reducing the frequency of such faults. In paper manufacturing, and in many other manufacturing processes, even a small decrease of faults may reduce production costs significantly.

It is expected that during the life of this patent many relevant parameter-based processes, manufacturing and industrial processes, and statistical analysis methods will be developed and the scope of the corresponding terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An apparatus for the analysis of a process having parameter-based faults, comprising:
    a parameter value inputter configured for inputting values of at least two process parameters;
    a learning file creator associated with said parameter value inputter, configured for generating a set of said input values obtained during normal process behavior and for creating a learning file for said set of input values, wherein said learning file is arranged for joint statistical analysis of said at least two process parameters;
    a learning file analyzer associated with said learning file creator, configured for performing a statistical analysis of said learning file so as to detect constellations of parameter values indicative of a fault, thereby to assess a process status; and
    process monitor associated with said learning file analyzer, configured for monitoring parameter values of an ongoing process so as to determine a current status of said ongoing process, and to provide alerts to a process operator in accordance with said current process status.

2. The apparatus of claim 1, wherein said learning file analyzer is configured generate a model of a statistical distribution of said input values during normal process behavior.

3. The apparatus of claim 2, wherein said model comprises a joint probability density of occurrence of constellations of parameter values during said normal process behavior.

4. The apparatus of claim 3, wherein said model specifies regions of parameter values in accordance with said probability density of occurrence, each of said regions being associated with a respective process status.

5. The apparatus of claim 4, wherein said process monitor determines said current status from a location of current parameter values within said regions.

6. The apparatus of claim 4, wherein said process monitor is configured to provide an alert when said current status comprises a deviation from a region of normal process behavior specified by said model.

7. The apparatus of claim 4, wherein said process monitor is configured to determine said current status from a trajectory of said input parameter values over said model.

8. The apparatus of claim 7, process monitor is configured to provide an alert when said trajectory approaches a deviation from a region of normal process behavior specified by said model.

9. The apparatus of claim 1, wherein said learning file analyzer is configured to perform joint statistical analyses of pairs of parameters.

10. The apparatus of claim 9, wherein said joint statistical analysis comprises providing a multi-dimensional probability density function of said pairs of parameters.

11. The apparatus of claim 1, further comprising a control unit configured to determine a preferred value of a controllable parameter so as to reduce a probability of a fault.

12. The apparatus of claim 11, wherein said control unit is further configured to automatically adjust a value of said controllable parameter to said preferred value.

13. A method for the analysis of a process having parameter-based faults, comprising:
    inputting the values of at least two process parameters over time;
    generating a set of said input values obtained during normal process behavior;
    creating a learning file for said set of input values, wherein said learning file is arranged for joint statistical analysis of said at least two process parameters;
    performing a statistical analysis of said learning file so as to detect constellations of parameter values indicative of a fault, thereby to assess a process status;
    monitoring parameter values of an ongoing process so as to determine a current status of said ongoing process; and
    providing alerts to a process operator in accordance with said current process status.

14. The method of claim 13, further comprising generating a model of a statistical distribution of said input values during normal process behavior.

15. The method of claim 14, wherein said model comprises a joint probability density of occurrence of constellations of parameter values during said normal process behavior.

16. The method of claim 15, wherein said model specifies regions of parameter values in accordance with said probability density of occurrence, each of said regions being associated with a respective process status.

17. The method of claim 16, further comprising determining said current status from a location of current parameter values within said regions.

18. The method of claim 16, wherein an alert is provided when said current status comprises a deviation from a region of normal process behavior specified by said model.

19. The method of claim 16, further comprising determining said current status from a trajectory of said input parameter values over said model.

20. The method of claim 19, wherein an alert is provided when said trajectory approaches a deviation from a region of normal process behavior specified by said model region.

21. The method of claim 13, wherein said process status comprises at least one of a group consisting of: an estimated time until fault, and an estimated probability of a fault within a specified time interval.

22. The method of claim 13, further comprising determining a preferred value for a controllable parameter so as to reduce a probability of a fault.

23. The method of claim 22, further comprising adjusting said controllable parameter to said preferred value.

* * * * *